UNITED STATES PATENT OFFICE.

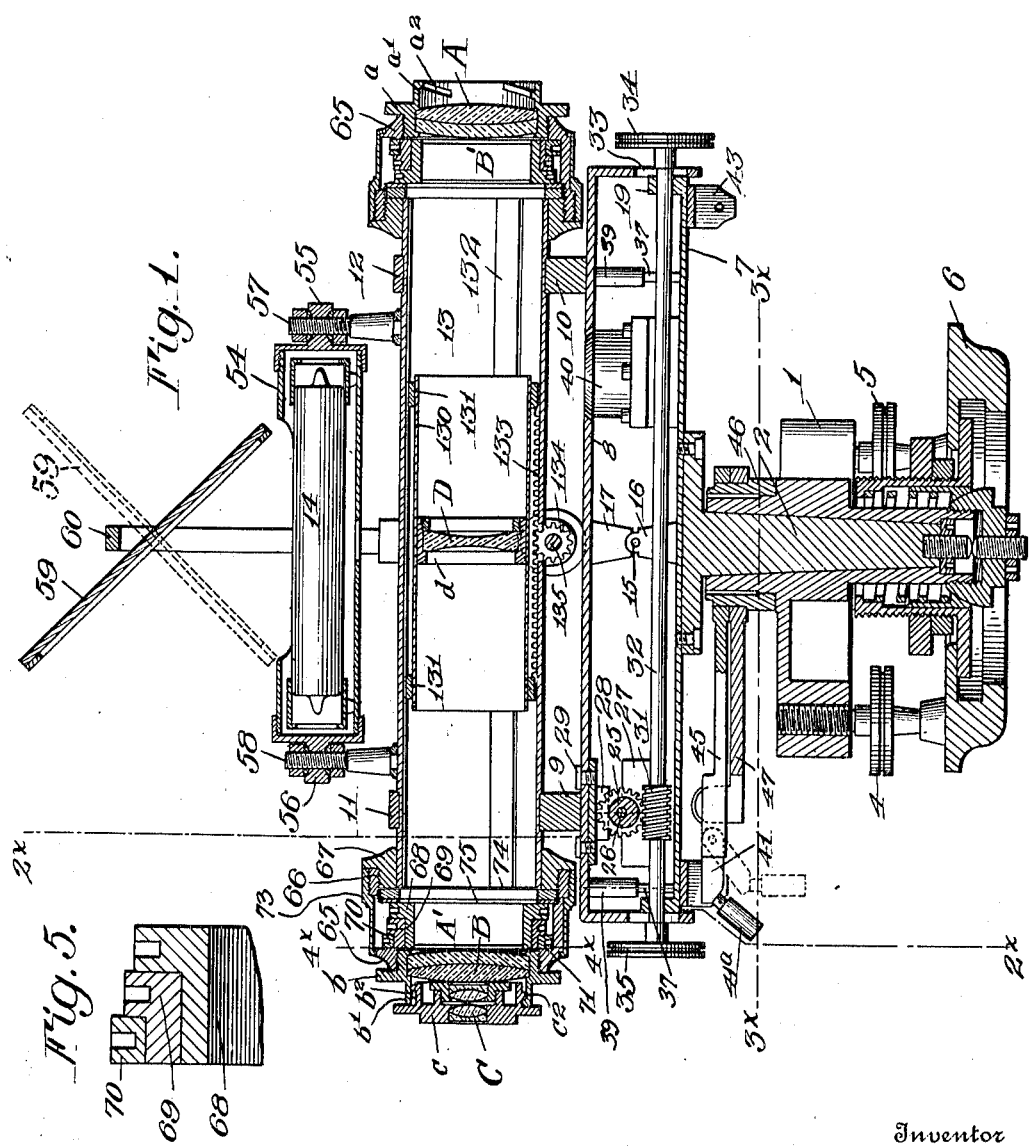

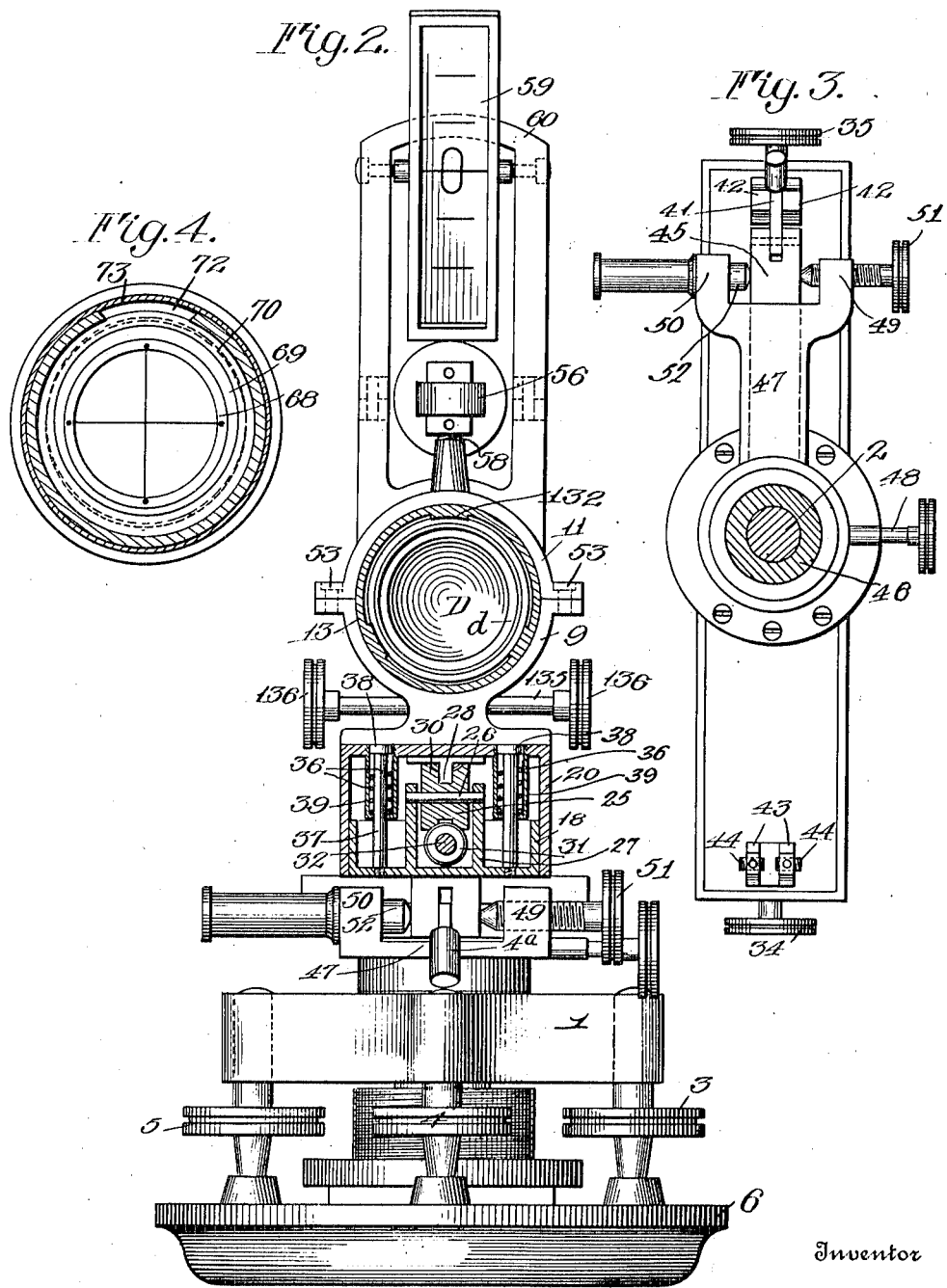

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

SURVEYOR'S LEVEL.

1,115,026. Specification of Letters Patent. Patented Oct. 27, 1914.

Application filed February 27, 1911. Serial No. 611,248.

*To all whom it may concern:*

Be it known that I, GEORGE N. SAEGMULLER, of Rochester, in the county of Monroe and State of New York, have invented certain new and useful Improvements in Surveyors' Levels; and I do hereby declare the following to be a full, clear, and exact description of the same, reference being had to the accompanying drawings, forming a part of the specification, and to the reference-numerals marked thereon.

My present invention relates to optical instruments and particularly to instruments for determining levels and known generally as surveyors' leveling instruments, and as such it has for its object to provide an improved form of telescope whereby observation may be made through either end of the instrument to obtain views by looking in opposite directions, thus greatly facilitating the labor of the surveyor in setting up the instrument at each station, and to test the adjustment.

My invention has for its further object to provide a novel mounting for the telescope whereby it may be rotated end for end through an accurate arc of 180° and locked on its vertical axis in each position of adjustment to the end that the operator may quickly adjust the verticality of said axis.

Another object of the invention is to provide a means for tilting the axis of the telescope relatively to the vertical axis of the instrument to obtain a finer or more delicate adjustment in a shorter space of time than can be gotten by the usual leveling screws of the base.

A further object of my invention is to provide a mounting for the cross-hairs of the telescope whereby these may be shifted laterally in all directions to position them in the true optical axis of the coöperating lens system.

To these and other ends the invention consists in certain improvements and combinations of parts, all as will be hereinafter more fully described, the novel features being pointed out in the claims at the end of the specification.

In the drawings: Figure 1 is a vertical sectional view of a surveying instrument or level illustrating the present embodiment of my invention; Fig. 2 is an end view taken on the line 2$^x$—2$^x$ of Fig. 1; Fig. 3 is a horizontal view taken on the line 3$^x$—3$^x$ of Fig. 1; Fig. 4 is a detail view showing the cross-hair mounting in elevation and taken on the section line 4$^x$—4$^x$ of Fig. 1, and Fig. 5 is an enlarged sectional view taken through one edge of the cross-hair adjusting rings.

Similar reference numerals in the several figures indicate similar parts.

In carrying out my present invention I have sought to produce a surveying instrument adapted to be used for precise leveling operations which will possess certain advantages both from a manufacturing and operating standpoint. In the use of leveling instruments it is absolutely necessary that the surveyor be particularly careful in adjusting the instrument so that when rotated on its vertical axis the optical axis of the telescope will rotate in a horizontal plane. In the ordinary Y level it is, of course, pre-supposed that the vertical axis of the instrument on which it rotates occupies a true angular position of 90° relatively to the horizontal optical axis of the telescope, and that the bubble tube on the telescope is accurately positioned in reference to the line of collimation of the telescope when the instrument leaves the maker's hands. Such being the fact the surveyor then is merely obliged to adjust the instrument to determine the verticality of its vertical axis each time the instrument is erected at a new station. However, in order that he may check his work and be certain that it is absolutely accurate, within certain reasonable variations permitted according to the nature of the survey, it is also necessary for him to verify the adjustment of the different parts of his instrument at least once or twice during each day's work.

My invention as applied to levels, has for its object the simplifying of operations necessary to check the accuracy of adjustment of the bubble tube relatively to the line of collimation, to avoid the necessity of removal of the telescope from and its reversal in the Y's, as is customary in the usual type of Y levels, and also to facilitate the rapid adjustment of the vertical axis of the instrument at the various stations when it is set up.

An instrument embodying my present invention will be mounted upon the usual tripod or other suitable support to which it is connected by the adjustable leveling head, the one in the present instance being that illustrated in Patent No. 955,911, granted April 26, 1910 to John L. Saegmuller and Albert Grebe, comprising the bearing 1 carrying the vertical axis 2 of the instrument, and which is adjustable by the three leveling screws 3, 4 and 5, bearing against the face of the underlying supporting member or head 6. The vertical axis 2 carries the base 7 supporting the adjustable rocking member 8 at opposite ends of which are the Y's 9 and 10 carrying the bearing rings 11 and 12 in which the telescope 13 is clamped, the latter being provided with the bubble tube 14. The base 7 is rigidly connected to the vertical axis and instead of forming the support for the Y's these are mounted, as shown, on the tilting member 8, which is capable of rocking slightly in a vertical plane, it being connected in the present instance with the base 7 by means of a horizontal pivot 15 lying in the plane of the vertical axis 2 and forming a hinge connection between the ends of the lugs or posts 16 and 17. The base 7 is provided along its lateral edges with upwardly extending flanges 18 and at each end with similar flanges 19, which parts are inclosed by the depending side walls 20 on the member 8. Near one end of the base is an operating member in the form of a cam 25 journaled on a horizontal axis 26 journaled at its ends in upwardly extending flanges 27 on the base 7. Coöperating with the cam is a small wear piece 28 projecting downwardly from the underside of the tilting member 8 to which it is attached by screws 29. In order to simplify the construction and the means employed for operating the cam, the latter is formed centrally in a spiral pinion 30, as best portrayed in Fig. 2, with which coöperates a worm 31 attached to the operating shaft 32 journaled in the flange 19 at each end of the base, the extremities of the shaft projecting through slots 33 in the end walls of the member 8 and provided with the operating finger-pieces or knurled knobs, 34 and 35 by means of which the shaft may be conveniently rotated. The member 8 is counterbalanced on its pivot 15 and supported for yielding adjustment relatively to the base 7 by means of a plurality of springs, such as 36, each of which surrounds a post 37. On the end of each of these posts is a head 38 bearing against one end of the spring inclosed within a tubular sleeve 39, the lower end of which engages the other end of the spring. The base 7 also carries a spirit level 40 arranged at one side of the vertical axis of the instrument and beneath an aperture provided in the tilting member 8, this level being provided for the assistance of the surveyor in setting up his instrument in the first instance, by means of which he can roughly determine the approximate verticality of the axis 2, the finer adjustments which are subsequently required being determined by the position assumed by the bubble in the tube 14 as it is rotated successively into one position or another relatively to the leveling screws 3, 4 and 5.

The arrangement of the optical parts of the telescope, which will be more fully described hereinafter, permit the rotation of the instrument upon its vertical axis and the reading of the divisions of the stadia rods which are set up in a straight line with the instrument and at opposite sides thereof, when it is desired to test the accuracy of the instrument. Unlike other leveling instruments the telescope is equipped with an arrangement of lenses whereby readings may be taken by sighting alternately through opposite ends of the telescope. This of course necessitates a reversal of the position of the telescope of 180° on its vertical axis and a corresponding shifting of the bubble tube, this changing of the telescope end for end and reversal of the bubble tube being equivalent to the usual operation of removing the telescope from the Y's and replacing it in reversed position therein, but possesses the advantage of obviating the inconvenience and difficulty to which this operation subjects the surveyor.

In an instrument embodying my invention the removal of the telescope from the Y's is unnecessary, and therefore to provide a means for quickly rotating it accurately through an arc subtended by an angle of 180°, either when double sighting the telescope in one direction, or when sighting it in opposite directions, I provide means for locking it initially in its adjusted position, which may be released and subsequently engaged when the telescope has been revolved. The locking device in the present instance comprises a small latch member 41 arranged stationary relatively to the base 7 having a handle portion 41$^a$ and adapted to be swung into and out of a slot formed between the depending ears 42 at one end of the base when the latter is rotated to subsequently engage between similar ears 43 at its opposite extremity, the latter being preferably provided with set screws 44 which may be adjusted to compensate for any inaccuracy in mechanical construction of the parts which may be sufficient to throw the line of sight of the instrument slightly to one side or the other of an absolutely straight line, when the base is revolved upon the vertical axis.

The locking device is always stationary relatively to the base 7 when the instrument is used in sighting upon a distant object, but as the angular position of the instrument relatively to its support is not determined until the leveling adjustments have been performed, said locking device is pivoted upon an arm 45, rotatable about the vertical axis 2, being supported upon an independent bearing in the form of a sleeve 46 mounted on the leveling head 1 to which it may be rigidly secured. Underlying the arm 45 is a similar arm 47 provided with a clamping screw 48 coöperating with the sleeve 46 and having at its outer end lugs 49 and 50 carrying the tangent screw 51 bearing against one side of the arm 45 and the opposing spring-operated plunger 52 engaging the opposite side of the arm to yieldingly hold it in engagement with the tangent screw.

The telescope 13 comprises the usual tube, as shown, held at its ends in the pivot rings 11 and 12 which are split as shown in Fig. 2, the upper and lower parts of said rings being clamped together by screws 53, whereby the tube is rigidly held instead of being removable as is customary in instruments of this character. It will also be noticed that the Y's 9 and 10 instead of being adjustable are rigidly fixed on the tilting member 8.

The bubble tube 14 is mounted in a casing 54 the extremities of which are provided with lugs 55 and 56 secured between adjusting nuts on the threaded ends of the supporting columns 57 and 58, which latter are rigidly mounted on the telescope tube 13. Employed in connection with the bubble tube is a reflector or mirror 59 supported in a yoke 60 whereby it may be inclined in two different angular positions, as shown in full and dotted lines in Fig. 1, to permit the operator to view the position of the bubble in its run-way irrespective of which of the two ends of the telescope may be used as the eye-piece end.

In the arrangement of the optical elements of the telescope I provide at each end thereof similar sets of objective lenses A and B and between the lenses, in the field of the image formed by either of them when used singly, I provide the usual set of cross-hairs, which, in the present instance, occupy the positions indicated respectively by A' and B'. With these similar lenses I employ an ocular at the end of the telescope tube including lens of proper curvature, although it preferably comprises a system of lenses for also erecting an image. In use I locate the ocular at the end of the telescope tube in such close proximity to one of the objectives that the optical properties thereof have no effect upon the ocular, the sight obtained through the latter being the same in all respects as if looking through a clear glass. The ocular when so arranged in rear of and in proximity to one lens will coöperate with the distant objective lens at the opposite end of the telescope tube and form an optical combination therewith to invert and magnify the image displayed at its respective set of cross-hairs.

The ocular might be supported independently of the telescope tube, but in practice the construction is simplified by the provision of means for detachably mounting it thereon whereby it may be easily disengaged, the instrument rotated, and the ocular again secured in position on the opposite end of the tube. This is conveniently accomplished by providing the mountings $a$ and $b$, in which the respective objective lenses are held, with collars $a'$ and $b'$ into which the mounting $c$ of the ocular is accurately fitted, said collars being provided with projections $a^2$, $b^2$ in the form of segmental threads with which similar projections $c^2$ on the ocular mounting $c$ coöperate. This arrangement of parts it will be observed merely requires that the ocular be given a partial rotation to either connect or disconnect it in position at either end of the telescope.

It is possible, but not practicable to so position the objective lenses A and B and their respective sets of cross-hairs, and to so construct the ocular that it will accurately focus upon the cross-hairs in respect to both objectives when sighting upon objects at different distances from the instrument, but as there are many factors which it is necessary to take into consideration in building the instrument and grinding the various lenses to obviate any parallax, I dispose centrally in the telescope a longitudinally adjustable double concaved lens D which may be adjusted relatively to objective lenses to properly focus their images. This lens is preferably mounted in a ring $d$ secured in a tube 130 provided at each end with exterior rings 131 which are guided on the ribs 132 extending longitudinally of the tube 13. The adjustment of the tube 130 is obtained by means of the rack 133 engaging the pinion 134 mounted on the shaft 135 provided at each end with the knobs 136, two knobs being employed so that one of them always occupies a position at the right hand side of the instrument for the convenience of the operator.

In the form of telescope described where two sets of cross-hairs are employed, it is desirable that the vertical and horizontal cross-hairs should be so disposed relatively to each other that their points of intersection may be accurately disposed in the line of collimation or true axes of the lenses. In other words the corresponding cross-hairs of each set should accurately lie in the horizontal and vertical planes intersecting the vertical axis of the telescope.

Ordinarily the reticule ring on which the cross-hairs are mounted is adjustable sidewise as well as in an upward and downward direction by means of capstan screws, the cross-hairs being properly positioned relatively to the horizon by either rotating the ring in the screws or rotating the telescope tube in the pivot rings. In my present invention I have provided an improved reticule adjusting mechanism which entirely obviates the use of capstan screws, and in carrying out this feature of the invention I provide for each set of cross-hairs a cylindrical section or barrel, forming part of the telescope tube, in which the cross-hair adjusting devices are mounted. This barrel forms a component element of the telescope tube and in the illustrations is shown as comprising the ring 65, carrying the mountings $a$ or $b$ of the objective lenses, having the interior threaded portion 66, by means of which it is secured to the annulus 67 on the tube 13. Contained within the barrel are three rings 68, 69 and 70 fitted one within the other, the last mentioned or outermost ring being accurately fitted and journaled within the barrel and supporting the other two rings. The outer ring 70 also rests against the inner shoulder 71 of the barrel, which is spaced inwardly a short distance from the inner surface of the objective lens, this distance, however, being regulated by the amount of separation desired between said lenses and the cross-hairs carried on the innermost ring 68, which are preferably secured to the outer edge of the latter. The inner surface of the ring 70 is eccentric to its outer surface and the same is true of the intermediate ring 69, while the outer and inner surfaces of the innermost ring 69 are concentric. The rings 69 and 68 are also provided with annular shoulders, as shown in Fig. 1, that of the former lying against the inner edge of the ring 70, while the shoulder on the ring 68 similarly engages the inner edge of the ring 69. These shoulders as well as the ring 70, are provided in their peripheries with apertures adapted to receive the pointed end of an adjusting pin which may be employed for rotating said rings, and to permit the operation of the pin a portion of the wall of the barrel 65 is removed, as indicated at 72, it being normally covered by a cap ring 73 threaded under the exterior of the barrel.

The several rings are frictionally held in the barrel by means of a ring nut 74, which engages the washer 75 lying against the inner edge of the ring 68, the adjustment of the nut serving to hold the several rings one within the other and to compress them against the shoulder 71 with sufficient friction to prevent their accidental displacement. The arrangement of these adjusting devices it will be understood is duplicated at each end of the telescope. When it is desired to adjust the separate sets of cross-hairs so that they assume true horizontal and vertical directions, this is conveniently done by rotating the innermost ring or reticule 68, it being unnecessary to move the telescope in the bearing rings 11 and 12. Subsequent adjustments which may be necessary to position the cross-hairs laterally to bring their points of intersection into the line of collimation of the telescope is accomplished by rotating either the intermediate eccentric ring 69 or the outer eccentric ring 70, or by rotating both of these relatively to each other, their various degrees of eccentricity permitting the accomplishment of the object sought.

An optical instrument constructed in accordance with my invention being reversible greatly simplifies the adjustments necessary in truing up the instrument when the parts are first assembled, and lessens the work of the surveyor in determining the accuracy of their adjustment, and also facilitates the adjustment of the instrument as a whole each time it is set up at a new station or point of observation.

I claim as my invention:

1. In an optical instrument, the combination with a tube, similar objective lenses at opposite ends of the tube and an ocular adapted to be placed at either end of the tube, and when so placed at one end of the tube to form an optical combination with the objective lens at the other end of the tube, of two sets of cross-hairs arranged in the tube, a revoluble and independently adjustable mounting for each set of cross-hairs journaled in the tube for positioning both sets of cross-hairs in like positions vertically and horizontally in the tube, said mountings also comprising means for further adjusting the cross-hairs with their respective points of intersection in the line of collimation of the instrument.

2. In a leveling instrument, the combination with a telescope provided with two objective lenses at its opposite ends and an ocular applicable to either end of the telescope, of a horizontally revoluble base supporting said telescope and a relatively stationary locking device adapted to coöperate with the base at points located at opposite sides of the axis of rotation to first secure the telescope in initial position with the ocular and one objective forming an optical combination and pointing in one direction, and secondly to secure it when rotated to point said optical combination of lenses in the opposite direction.

3. In an optical instrument, the combination with a tube mounted for horizontal observation in opposite directions and provided with two similar objective lenses at its opposite ends and an ocular coöperating with both objectives, of two sets of cross hairs and means for independently adjusting said sets relatively to each other and to the line of collimation of the lenses.

GEORGE N. SAEGMULLER.

Witnesses:
WILLIAM G. WOODWORTH,
DANIEL M. SMITH.